Aug. 9, 1960 S. RUBEN 2,948,768
SULFAMATE PRIMARY CELL
Filed Oct. 14, 1957
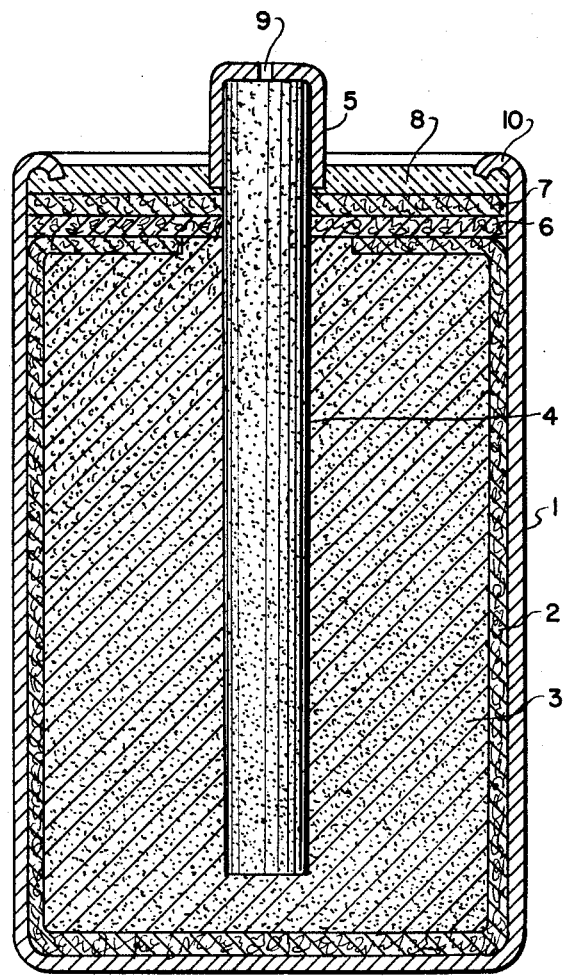
INVENTOR.
Samuel Ruben
BY
ATTORNEY

United States Patent Office 2,948,768
Patented Aug. 9, 1960

2,948,768

SULFAMATE PRIMARY CELL

Samuel Ruben, 52 Seacord Road, New Rochelle, N.Y.

Filed Oct. 14, 1957, Ser. No. 690,126

5 Claims. (Cl. 136—100)

This invention relates to electric current producing cells and, more particularly, to primary cells. The application is a continuation in part of my co-pending application, Serial No. 687,927, Electric Current Producing Cell, filed October 3, 1957.

In my above referred to application, I describe a primary cell comprising a zinc anode, a depolarizer of mercuric dioxysulfate and an electrolyte comprising an aqueous solution of zinc sulfamate. I have found that the use of sulfamate electrolytes may be advantageously employed in many types of primary cells.

It is an object of the present invention to provide an improved type of primary cell employing a sulfamate electrolyte.

It is a specific object of the invention to produce an improved copper oxide primary cell.

Further objects will be apparent as the disclosure proceeds and from the drawing which is a longitudinal sectional view having parts in elevation of a cell structure embodying the invention.

In the past copper oxide has been used as a depolarizer in alkaline electrolytes, particularly with liquid electrolytes, such as sodium or potassium hydroxide. Copper oxide has not been employed in conventional dry cells because of the solubility of the copper oxide, the resultant copper compounds therefrom tending to react with the spacer. Liquid type cells employing copper oxide require a continuous load, even on shelf, to prevent the zinc anode becoming coated with copper reduced from the solution, due to the presence of zinc.

I have found that copper oxide is an efficient depolarizer when used with electrolytes composed of salts of sulfamic acids, and when so used can be embodied in conventional dry cell structures. I have also found that when copper oxide is used as the depolarizer element with sulfamate salt electrolytes, that higher potential anodes, such as magnesium can be used and thus overcome the lower potential of copper oxides.

In a preferred assembly the depolarizer is composed of a mixture of finely ground cupric oxide mixed with an electrolyte retaining material, such as carbon black. The anode comprises magnesium and the electrolyte comprises magnesium sulfamate.

Referring now to the drawing, reference numeral 1 denotes the magnesium can serving as the container anode having a porous liner 2 composed of three mil kraft paper coated with a mixture of 4% by weight of carboxymethylcellulose, 4% by weight of glycerine, balance water.

The depolarizer bobbin mix 3 is prepared by milling 8 parts by weight of micronized cupric oxide and one part of Shawinigan carbon black. To this mixture I add 50% by weight of a 15% solution of magnesium sulfamate containing 1% by weight of potassium dichromate to inhibit corrosion of the magnesium on shelf, said electrolyte having a pH of about 5.2. The mixture is compressed into a bobbin after which a carbon rod 4, having a brass terminal contacting cap 5 and vent hole 9 is pushed into the bobbin. The bobbin is then forced into paper lined can and compressed so that it establishes firm contact with the spacer.

Wax impregnated cardboard discs 6 and 7 are forced into the container 1 to hold down the top end portion of paper liner 2 which folds over the top surface of the bobbin under compression. The open end of the container is then rolled over as indicated at 10 and a layer 8 of fused hard wax is poured on top of disc 7 to seal the cell.

A cell of the described character has an open circuit voltage of approximately 1.53.

Cupric oxide is the preferred copper oxide but cuprous oxide or the hydroxide may also be used.

Magnesium sulfamate is the preferred electrolyte. However, the cells of this invention will operate with any sulfamate electrolyte that does not contain a metal ion which can be displaced by the anode or which does not contain the ion of a metal lower in potential than the anode.

Although the present invention has been disclosed in connection with a preferred embodiment thereof, variations and modifications may be resorted to without departing from the principles of the invention. I consider all of these variations and modifications to be within the spirit and scope of the present invention as disclosed in the foregoing description and defined by the appended claims.

I claim:

1. A primary dry cell comprising a magnesium anode, a cathode depolarizer comprising a mixture of an oxide of copper and carbon, and an electrolyte absorbed in said cathode depolarizer, said electrolyte being composed of an aqueous solution of a sulfamate salt of a metal which is not displaced by magnesium.

2. A primary dry cell comprising a magnesium anode, a cathode depolarizer mixture essentially composed of a major portion of an oxide of copper and a minor portion of carbon, and an aqueous magnesium sulfamate electrolyte absorbed in said cathode depolarizer.

3. A primary dry cell comprising a magnesium anode, a cathode depolarizer essentially composed of a mixture of an oxide of copper and carbon, and an electrolyte absorbed in said cathode depolarizer and essentially composed of an aqueous solution of the sulfamate salt of a metal selected from the group consisting of magnesium and metals higher in potential than magnesium.

4. A primary dry cell comprising a magnesium anode, a cathode depolarizer essentially composed of a mixture of cupric oxide and carbon, and an electrolyte of an aqueous solution of magnesium sulfamate containing a small proportion of a chromate inhibitor absorbed in said cathode depolarizer.

5. A primary dry cell comprising an anode can of magnesium, a cathode depolarizer bobbin in said can essentially composed of a mixture of an oxide of copper and carbon, a porous liner interposed between said can and said bobbin, and an aqueous electrolyte absorbed in said bobbin and constituting a substantial portion of the total weight of said bobbin, said electrolyte being composed of an aqueous solution of a sulfamate salt of a metal which is not displaced by magnesium and being substantially free from sulfamic acid.

References Cited in the file of this patent

UNITED STATES PATENTS

| | | |
|---|---|---|
| 479,887 | Lalande | Aug. 2, 1892 |
| 2,810,006 | Ruben | Oct. 15, 1957 |
| 2,814,663 | Ruben | Nov. 26, 1957 |
| 2,814,664 | Ruben | Nov. 26, 1957 |